United States Patent
Vaughan

(10) Patent No.: US 7,185,336 B2
(45) Date of Patent: Feb. 27, 2007

(54) SYSTEM AND METHOD FOR SELECTING AND INSTALLING A DEVICE DRIVER

(75) Inventor: Robert D. Vaughan, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 596 days.

(21) Appl. No.: 10/116,374

(22) Filed: Apr. 3, 2002

(65) Prior Publication Data

US 2003/0192040 A1    Oct. 9, 2003

(51) Int. Cl.
*G06F 9/445* (2006.01)
(52) U.S. Cl. ..................... 717/178; 717/175
(58) Field of Classification Search ......... 717/168–178
See application file for complete search history.

(56) References Cited

U.S. PATENT DOCUMENTS 6,665,725 B1 * 12/2003 Dietz et al. ................. 709/230

2001/0042112 A1 * 11/2001 Slivka et al. ............... 709/220
2002/0002630 A1 * 1/2002 Nomura et al. ............. 709/310

OTHER PUBLICATIONS

Willis et al, "Windows 2000 System Administration Handbook", Prentice Hall, Chapter 5, pp. 1-16, Jun. 2000.*

* cited by examiner

*Primary Examiner*—Ted T. Vo

(57) ABSTRACT

A system and method for obtaining software is disclosed. An operating environment of a first computer system is analyzed. A profile based on the operating environment is created. The profile is sent to a second computer system and the second computer system selects software based on the profile. The second computer forwards an indication of where the software is located and a software retrieval process is engaged. Software compatible with the profile is received.

18 Claims, 5 Drawing Sheets

SYSTEM AND METHOD FOR SELECTING AND INSTALLING A DEVICE DRIVER

TECHNICAL FIELD

The present invention relates to software distribution.

BACKGROUND ART

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Frequently, these advantageous results are realized through the use of software stored on a memory media and implemented by a processing device. Selecting and accessing appropriate software directed to producing desired results is often very cumbersome and complicated.

Software typically includes information utilized in the performance of a multitude of tasks directed towards providing a variety of results. For example, software is often used to control and direct device operations in a computer system. Software requirements for different systems typically vary and are seldom static. For example, most computer systems are not configured with identical components and the different components (e.g., printers, network cards, video cards, etc.) usually require different software device drivers. When a device is added to a system an appropriate device driver is required to be installed to enable the operating system to manage the device. New software is also often required to be added to a system to take advantage of advances in technology or provide functions included in new software programs.

Determining appropriate software for the performance of a task and successfully installing the software are activities requiring a relatively high degree of precision and accuracy. Choosing and loading an appropriate software application typically involves significant user interaction that often requires extensive specialized knowledge beyond the range of general user experience. For example, selected software usually has to coherently interact with very specific individual idiosyncrasies of numerous different devices. There are also numerous different functions a user may desire to implement and picking software capable of providing maximized results is usually very difficult. Selecting appropriate software and correctly installing it are usually critical to accomplishing desired results.

Providing users with a wide assortment of software and an opportunity for maximizing satisfaction with desired functionality is important. Centralized storage with access over a network for downloading of particularly desired software to distributed resources usually provides some advantages and relieves individual distributed systems from managing extraneous information. Traditional attempts at accessing software via a network system typically require the user to determine appropriate software, manage the software communication (e.g., via a file transfer protocol, hyper text transfer protocol, etc.) and install the software properly. Each of these activities are usually very susceptible to user error and users typically have difficulty with activities such as figuring out the system hardware with sufficient specificity, accurately conveying correct information in a communication protocol, and executing the proper instructions to install the software. Prior attempts at addressing software distribution usually involve the dissemination of information consisting of highly technical brief statements beyond the comprehension of the average user and offer little practical guidance.

Thus, the prior art requires a user to possess significant expertise and employ exhaustive efforts in analyzing complicated target configurations and participate in convoluted processes to load software on a target system.

DISLOSURE OF THE INVENTION

A system and method for obtaining software is disclosed. An operating environment of a first computer system is analyzed. A profile based on the operating environment is created. The profile is sent to a second computer system and the second computer system selects software based on the profile. The second computer forwards an indication of where the software is located and a software retrieval process is engaged. Software compatible with the profile is received.

BEST MODES FOR CARRYING OUT THE INVENTION

Figure 1:
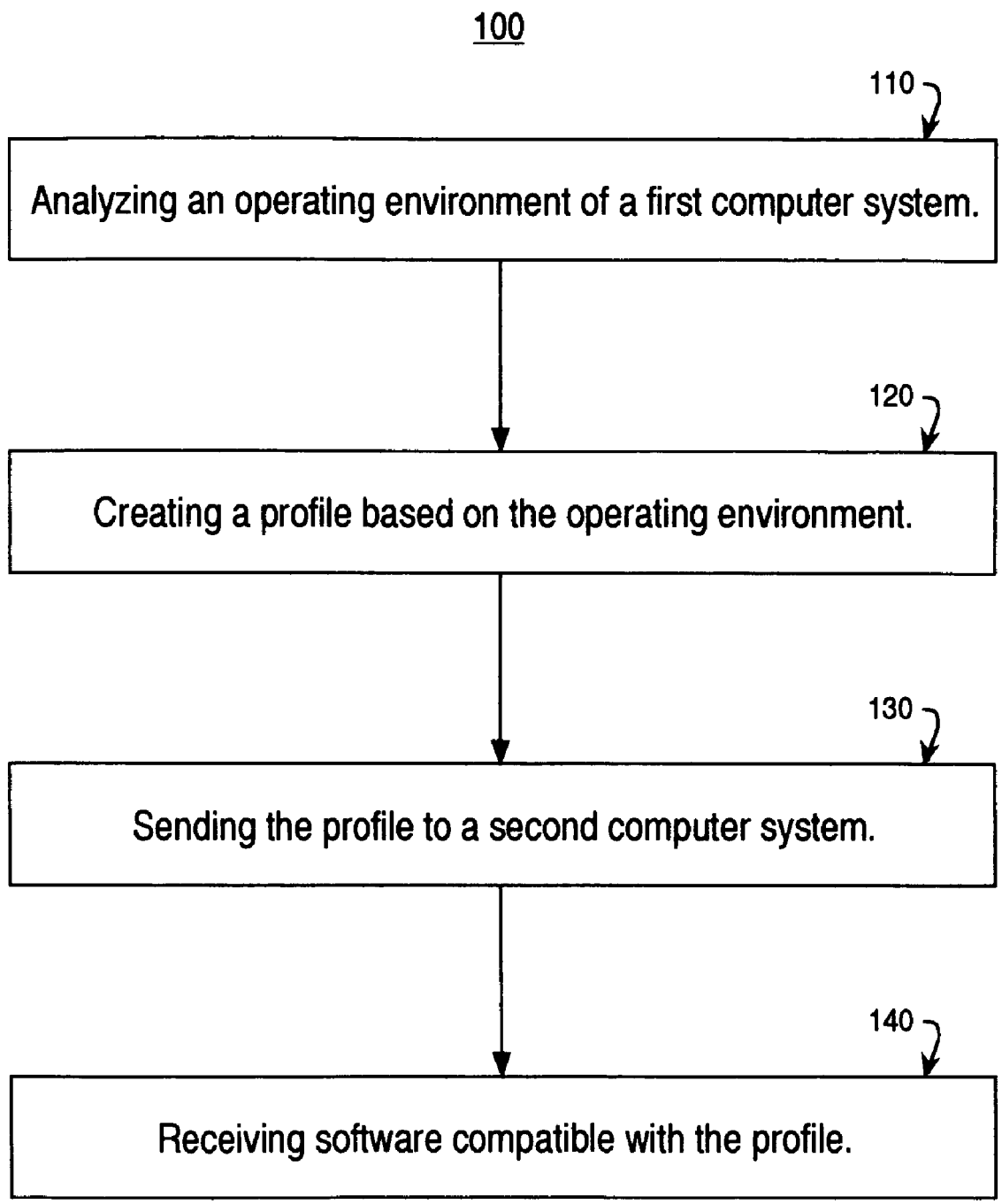
FIG. 1 is a flow chart illustrating a method for obtaining software in accordance with a first embodiment of the present invention.

Reference will now be made in detail to the preferred embodiments of the invention, a system and method for obtaining software, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood the present invention may be practiced without these specific details. In other instances, some items have not been described in detail as not to unnecessarily obscure aspects of the current invention.

A software obtaining system and method in accordance with one embodiment of the present invention facilitates convenient and efficient distribution of software. A user is provided assistance in analyzing a target device or system the user intends to utilize the software with. The user is also provided assistance in loading and installing the software on the target device or system. In most instances, operations associated with analyzing the target, preparing a request for software compatible with the target, accessing the software, and installing the software are performed automatically thereby reducing arduous and error prone user interaction to a minimum. Thus, the user is relieved from performing convoluted tasks requiring a relatively high degree of knowledge and precision with regards to the target device and the software.

An automated analysis of the target device is executed. The analysis is directed at discovering what components are included in the target system. Thus, a user is not required to have extensive knowledge of the components included in a target system nor engage in convoluted activities directed at extracting the information from the system. Based upon the results of the analysis, a request for software that is compatible with the target device is developed. The request includes indications of desired software parameters and attributes. Again, a user does not have to have expertise in constructing complex queries and the potential for syntax errors is significantly reduced. Should a user wish to have greater participation in the process, flexible provisions are also made to include indications of user desired objectives (e.g., special functionality) in the request. These provisions include providing the user with convenient suggestion prompts and easily understood explanations. The final formulated request with automatically included pertinent information is forwarded to a centralized resource.

The centralized resource identifies software with features corresponding to the request and the target device engages in a download process in which the software files are communicated from the identified storage location of the centralized repository to the target device. A file transfer process is implemented and the software files are loaded on the target system. A user is relieved from having to uniquely identify the precise software files that are downloaded. If the software files are communicated in a compressed format they are automatically decompressed when loaded on the target system. The user does not have to figure out the compression/decompression formulas and provide the necessary information to perform the decompression operations. In one embodiment, the software is then automatically setup for operation on the target system. Thus, a user does not have to delve into a convoluted search of the target system to determine where the downloaded files are stored and retrieve them for installation. The user also does not have to expend efforts engaging in complex installation processes to install the program in a correct configuration setup that enables the software to operably interact with the target system in a proper manner.

FIG. 1 is a flow chart illustrating a software obtaining method 100 in accordance with one embodiment of the present invention. Method 100 facilitates automated acquisition of target compatible software from a centralized storage location (e.g., via the internet). Software obtaining method 100 assists a target system to automatically analyze itself, develop a request for software based upon the analysis, and access software designed to operate on the target system in the performance of desired tasks.

In step 110, an operating environment of a first computer system is analyzed automatically. The operating environment of the first computer system comprises an operating system, hardware and initial software. The initial software resides on a target system and the target is engaging in software obtaining method 100 to obtain updates and/or additional software. In one exemplary implementation, a setting in a registry of the first computer system is scanned and information describing the operating environment is extracted.

In step 120, a profile based on the operating environment is created. The profile includes indications of operating environment components identified in step 110. The profile may also include user input (e.g., indications of user desired functionality). A user prompt comprising software selection suggestions is generated and the user responses are included in the profile. An indication is provided of the device the software is for, applicable language utilized with the device, and an operating system the device interacts with. For example, a type of printer (e.g., Laserjet™, Deskjet™, etc.), a natural language (e.g., English, French, Spanish, etc.) utilized with the printer and the operating system identification (e.g., NT, Linux, 2K, etc.) including version.

The profile is sent to a second computer system in step 130. The profile is included in a request for software compatible with the profile.

For example, the profile is transmitted within a uniform resource locator.

The second computer system selects compatible software (e.g., a device driver) based on the profile and returns a recommendation. The recommendation includes an indication of suggested new software.

In step 140, software compatible with the profile is received. The reception of the software is performed through a file access process. The file access process utilizes received information describing the software, including verification of software features and a location of where the software is stored. In one exemplary implementation, the software description information (e.g., designation information) is received in extensible markup language (XML) format. Information describing features of the software is parsed to extract information necessary for loading the software.

In an optional step (not shown) the software is installed. The installation information is included in the software description information. The software is decompressed and decompression information is also included in the description information.

Figure 2:
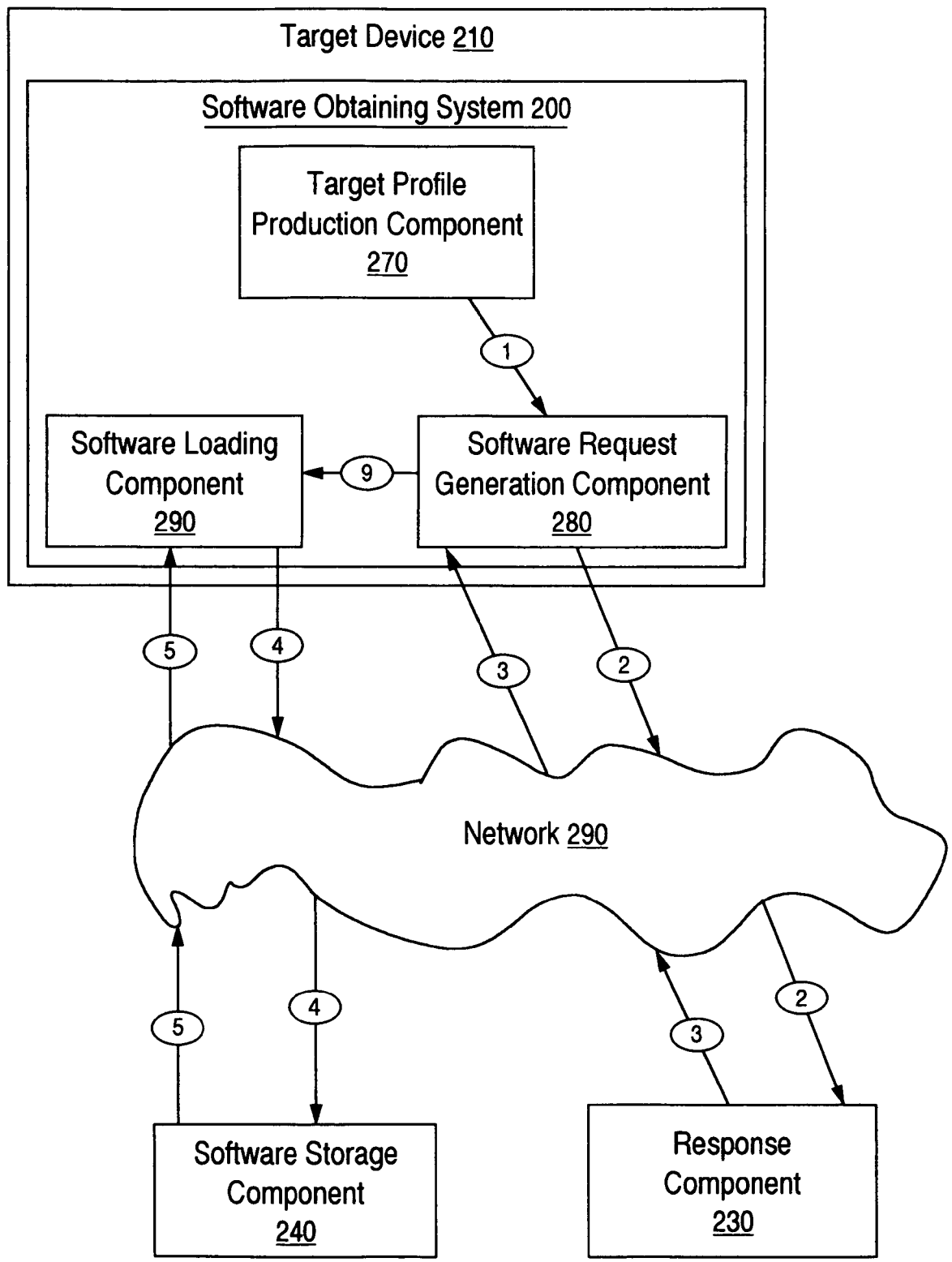
FIG. 2 is a block diagram of showing a software obtaining system in accordance with another embodiment of the present invention.

FIG. 2 is a block diagram showing software obtaining system 210, one embodiment of the present invention. Software obtaining system 210 comprises a target profile production component 270, software request generation component 280, and software loading component 290. Target profile production component 270 is coupled to software request generation component 280 which is coupled to software loading component 290.

The components of software obtaining system 200 cooperatively operate to obtain software. Target profile production component 270 produces a profile of a target system summarizing component characteristics and forwards the profile information to software request component 280 via signal 1. The profile includes information indicating components included in target device 210 (e.g., hardware, software and operating systems included in the target system). The profile information is interpreted by software request component generation 280 and used to generate a request for software. The profile information provides an indication of requisite and desirable attributes that the requested software should have. Software request generation component 280 forwards the request to response component 230 via signal 2 across network 290.

Software request generation component 280 receives a response from response component 230 via signal 3 which is also communicated over network 290. The response comprises an indication of compatible software. Software request generation component 280 confirms the selected software is compatible with target device 210 and forwards the information on to software loading component 290 via signal 9.

Software loading component 290 receives the information from response component 230 (e.g., via network 290 and signal 9 from software request generation component 280) and utilizes the information to load the software. Software loading component 290 receives information indicating software compatible with the software inquiry and the location of the software. Software loading component 290 engages in a communication protocol (e.g., ftp, http, etc.) via network 290 (e.g. the Internet) in which software corresponding to the software inquiry is retrieved. The information received in response to the software inquiry is parsed by software loading component 290 and the location of "matching" software is extracted. For example, software loading component 290 engages in a communication process via signal 4 (e.g., ftp, http, etc.) in which software is copied from software data storage component 240 via signal 5. Software loading component 290 decompresses and installs the software corresponding to the software inquiry.

Figure 3:
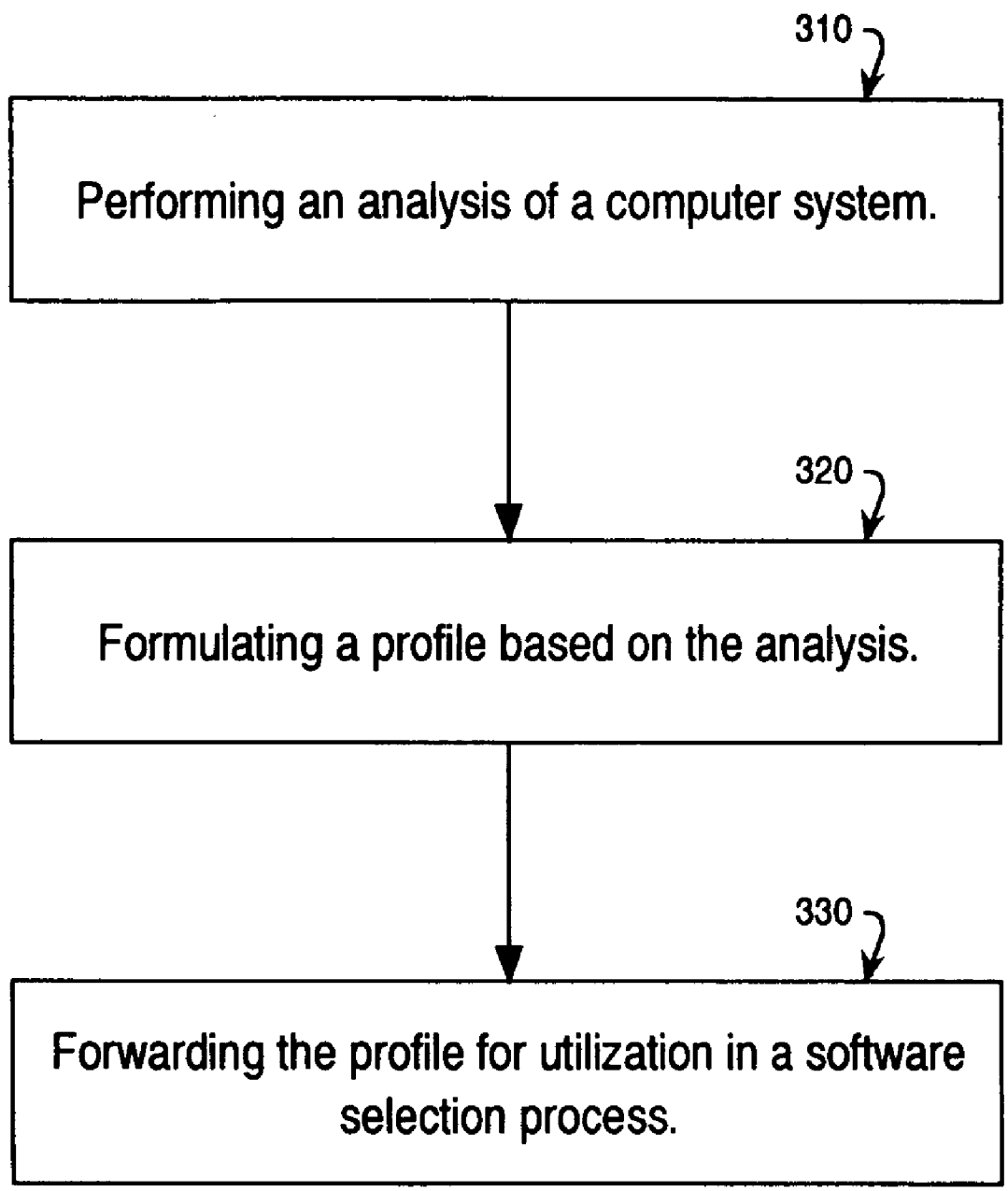
FIG. 3 is a flow chart illustrating a target profile creation process utilized to develop a profile describing software requirements in accordance with one embodiment of the present invention.

FIG. 3 is a flow chart of target profile creation process 300, one embodiment of a present invention target profile creation process. Instructions for performing target profile creation process 300 are stored on a computer readable medium. The instructions (e.g., computer readable code) cause a computer system to perform a target profile creation process 300.

In step 310, an analysis of a system is performed. The analysis comprises identifying components included in the computer system (e.g., hardware, software, operating system, etc.). Operating system calls can be used to discover information used in the analysis (e.g., the operating system type, natural language the user is using to interface with the system, etc.). A network communication protocol (e.g., SNMP) is utilized to ask a device to identify itself in one embodiment by providing its device identification (ID), which when parsed provides a model substring.

A profile is formulated based on the analysis is step 320. The profile includes information describing components (e.g., hardware, software, operating system, etc.) in the system. In one embodiment, a user prompt is rendered comprising a prompt directed at obtaining information about the user's intended usage of the computer system and information associated with the responses are included in the profile.

In step 330, the profile is forwarded for utilization in a software selection process. For example, the profile describes a hardware device and is utilized to select an updated hardware device driver. The profile is communicated within a uniform resource locator (URL) address in one exemplary implementation.

Figure 4:
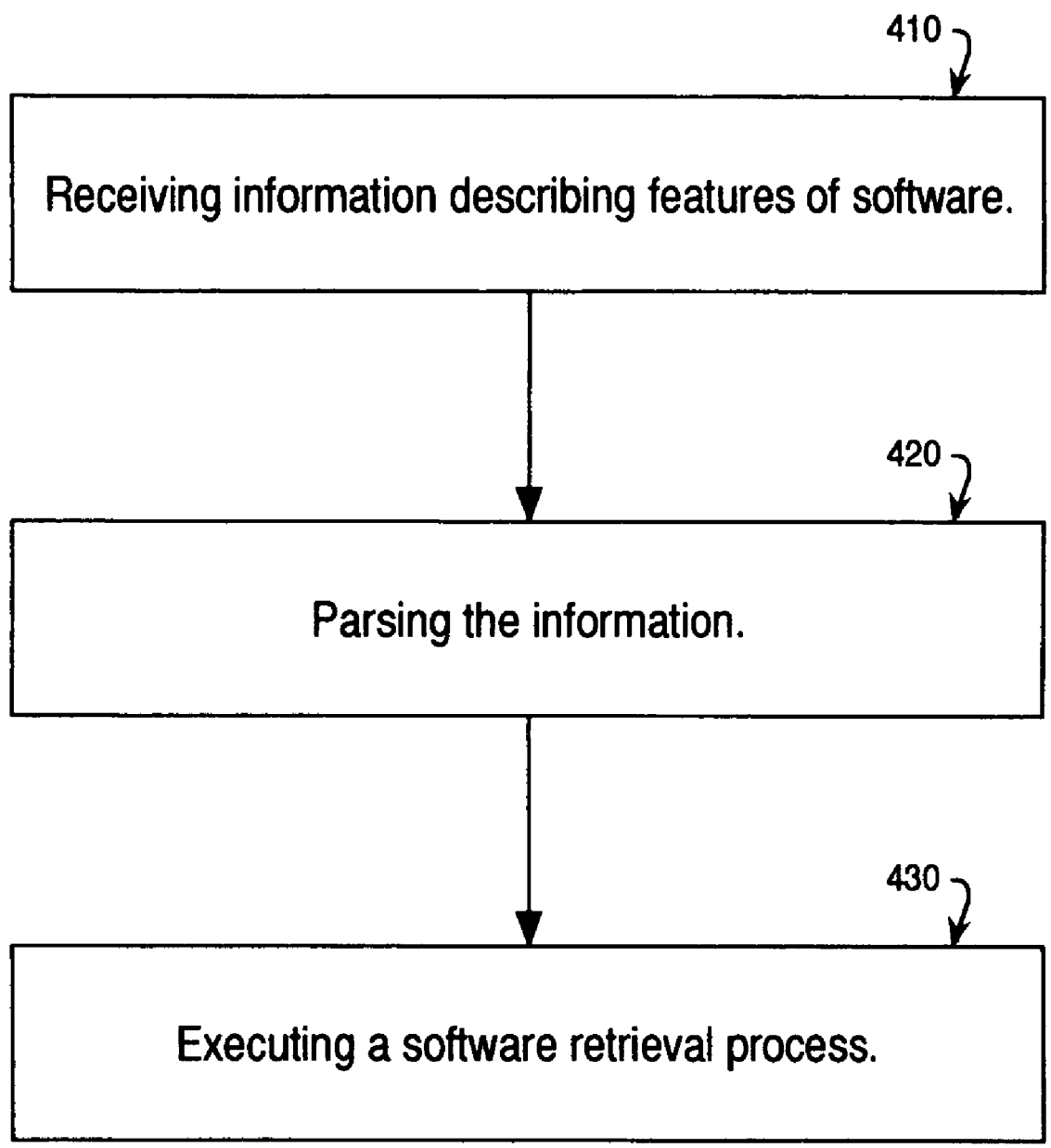
FIG. 4 is a flow chart showing a present invention software access process in which software is retrieved from a centralized source in accordance with an embodiment of the present invention.

FIG. 4 is a flow chart of software access process 400, one embodiment of a present invention software access process. Software located in a data storage component is obtained. For example, software in a data storage component is copied and transferred from a centralized software server to a remote distributed target.

In step 410, information describing features of the software is received. The information is received in extensible markup language (XML) format. The received description information includes a language identifier, an operating system identifier, and a hardware feature identifier (e.g., a printer identifier).

The information is parsed in step 420. The parsed information includes information that an installer, management application, or other application requires to interact with the described software.

In step 430, a software retrieval process is executed. A software file is retrieved from a remote software repository via a communication transfer protocol (e.g., ftp, http, etc.). The information is decompressed in accordance with decompression algorithm information received in step 310.

One embodiment of the present invention includes an optional step (not shown) in which the software is automatically configured in a manner ready for operation. The software is directed to an installer that utilizes information received in step 410. The software may be a wide variety of software (e.g., device drivers, firmware images, BIOS information, upgradeable binary components, etc.).

Figure 5:
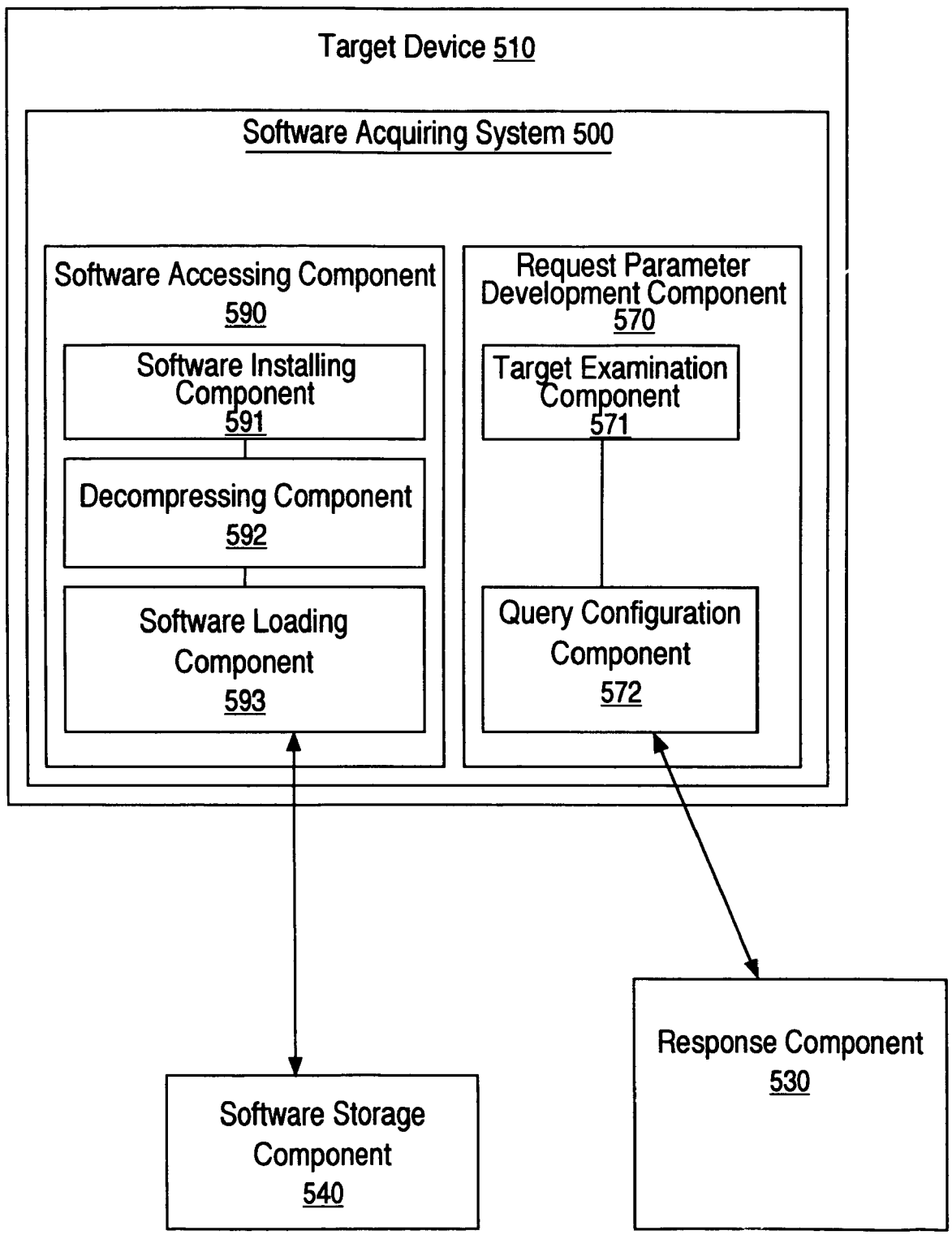
FIG. 5 is a block diagram illustrating an alternative software acquisition system in accordance with one embodiment of the present invention.

FIG. 5 is a block diagram including software acquisition system 500, one embodiment of a present invention software acquisition system. Software acquisition system 500 comprises a request parameter development component 570 and a software accessing component 590. Request parameter development component 570 develops request parameters for desired software. Request parameter development component 570 forwards a software request to response component 530 in a uniform resource locator (URL) format. Software accessing component 590 receives software description information included in a extensible markup language (XML) format. Software accessing component 590 accesses software stored in software storage component 540.

Request parameter development component 570 comprises target examination component 571 and parameter indication component 572. Target examination component 571 is coupled to parameter indication component 572. Target examination component 571 examines the operating environment of target device 510. Query configuration component 572 utilizes the results of the examination to provide an indication of components included in target device 510 and parameters associated with those components. Query configuration component 572 configures a query that includes an indication of desired software compatible with components included in a target system. The query is included in a uniform resource locator (URL). The request is formulated in a communications compatible format and communication of the request is made to response component 530. In one exemplary implementation of the present invention, the software is a device driver.

Software accessing component 590 retrieves software via a network communication protocol. Software accessing component 590 includes a software installation component 591, a decompressing component 592 and software loading component 593. Software installing component 591 is coupled to decompressing component 592 which is coupled to software loading component 593. Software installation component 591 installs software on target device 510. Decompressing component 592 decompresses software. Software loading component 592 loads software on target 510.

Thus, the present invention facilitates convenient access to software. The present invention relieves a user from delving into complicated operations associated with identifying and accessing appropriate software for a system (e.g., device drivers for devices included in a system). The present invention automatically determines required software parameters and relieves a user from engaging in a complicated analysis of a target system, retrieves software corresponding to the required software parameters without the potential for user syntax errors in the communications, and installs software conveniently. The present invention also flexibly permits meaningful user participation by prompting with simplified choices. Thereby, a software distribution system and method of the present invention assists a user to correctly determine software requirements and facilitates reduction of potential problems associated with user errors encountered when selecting and downloading software.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application with the intent of enabling others skilled in the art to utilize the invention and different embodiments, with various modifications as are suited to the particular use contemplated. It is intended that the scope of the invention be defined by the Claims appended hereto and their equivalents.

What is claimed is:

1. A computer-implemented method for selecting and installing a device driver for driving a device coupled with a first computer system comprising:
    analyzing an operating environment of said first computer system;
    creating a profile based on said operating environment, said profile comprising an operating system configuration, a hardware configuration comprising a description of said device, and a software configuration describing a requirement with respect to said device of an application loaded on said first computer system;
    sending said profile to a second computer system;
    selecting said device driver from a plurality of device drivers on said second computer system, wherein said device driver is compatible with said profile;
    receiving said device driver at said first computer system; and
    installing said device driver on said first computer system.

2. A method as recited in claim 1 wherein said profile is transmitted within a uniform resource locator.

3. A method as recited in claim 1 further comprising receiving information describing said device driver at said first computer system.

4. A method as recited in claim 3 wherein said information includes verification of device driver features and an identification of a location where said device drivers are stored.

5. A method as recited in claim 3 wherein said information includes a recommended device driver.

6. A method as recited in claim 3 wherein said information is received in extensible markup language format.

7. A method as recited in claim 1 wherein said device is a printer.

8. A system for selection and installation of a device driver for driving a device coupled with a target computer system comprising:
    a target profile production component that analyzes said target computer system and produces a profile of said target computer system, said profile comprising an operating system configuration, a hardware configuration comprising a description of said device, and a software configuration describing a requirement with respect to said device of an application loaded on said target computer system;
    a device driver request generation component coupled to said target profile production component, wherein said device driver request generation component generates a request for a device driver that is compatible with said profile and sends said request to a response component; and
    a device driver loading component coupled to said device driver request generation component, wherein said device driver loading component receives said device driver that is compatible with said profile and installs said device driver on said target computer system.

9. The system of claim 8 wherein said device driver loading component engages in a communication process in which information describing said device driver is received in response to said request for said device driver.

10. The system of claim 9 wherein said device driver loading component parses said information received in response to said request for said device driver.

11. The system of claim 10 wherein said device driver loading component extracts a list of device driver features and a location of said device driver corresponding to said device driver request.

12. The system of claim 10 wherein said device driver loading component extracts a recommended device driver.

13. The system of claim 8 wherein said device is a printer.

14. A computer readable medium having computer readable code embodied therein for causing a first computer system to perform a process for selection and installation of a device driver for driving a device coupled with said first computer system, said method comprising:
    performing an analysis of said first computer system;
    formulating a profile based on said analysis, said profile comprising an operating system configuration, a hardware configuration comprising a description of said device, and a software configuration describing a requirement with respect to said device of an application loaded on said first computer system;
    forwarding said profile to a second computer system for utilization in a software selection process;
    selecting said device driver from a plurality of device drivers on said second computer system, wherein said device driver is compatible with said profile;
    receiving said device driver at said first computer system; and
    installing said device driver on said first computer system.

15. A computer readable medium as recited in claim 14 further comprising receiving information describing said device driver at said first computer system.

16. A computer readable medium as recited in claim 15 wherein said information includes verification of device driver features, an identification of a location where said device drivers are stored, and a recommended device driver.

17. A computer readable medium as recited in claim 14 wherein said profile is transmitted within a uniform resource locator address.

18. A computer readable medium as recited in claim 14 further comprising:
    rendering a prompt to inquire about a user's intended usage of said first computer system; and
    including information associated with responses to said prompt in said profile.

* * * * *

UNITED STATES PATENT AND TRADEMARK OFFICE
CERTIFICATE OF CORRECTION

| | | |
|---|---|---|
| PATENT NO. | : 7,185,336 B2 | Page 1 of 1 |
| APPLICATION NO. | : 10/116374 | |
| DATED | : February 27, 2007 | |
| INVENTOR(S) | : Robert D. Vaughan | |

It is certified that error appears in the above-identified patent and that said Letters Patent is hereby corrected as shown below:

On sheet 3 of 5, in Fig. 3, line 1, above Box "310" insert -- 300 --.

On sheet 4 of 5, in Fig. 4, line 1, above Box "410" insert -- 400 --.

Signed and Sealed this

Fifth Day of May, 2009

JOHN DOLL
*Acting Director of the United States Patent and Trademark Office*